July 30, 1957  G. C. CROWLEY  2,801,318
HEATING DEVICE CONTROL CIRCUIT
Filed May 19, 1955
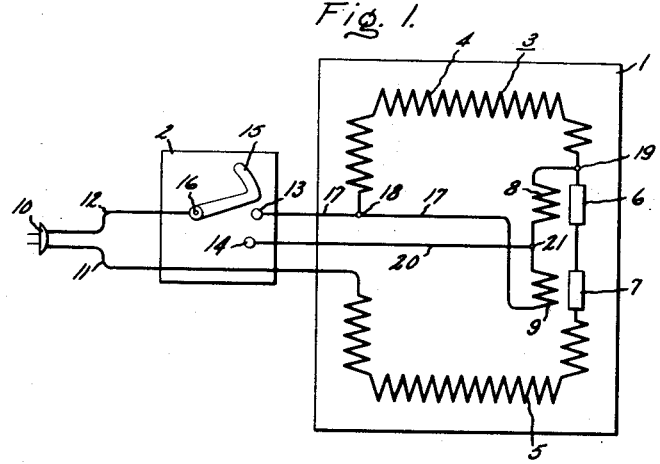
Fig. 1.
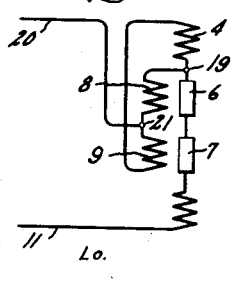
Fig. 2. Lo.
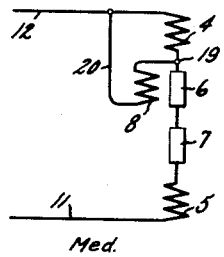
Fig. 3. Med.
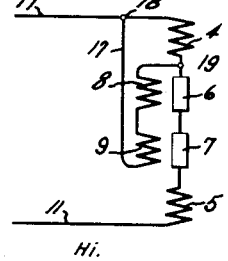
Fig. 4. Hi.
Inventor:
George C. Crowley,
by Lawrence R. Kempton
His Attorney.

United States Patent Office 2,801,318
Patented July 30, 1957

2,801,318

HEATING DEVICE CONTROL CIRCUIT

George C. Crowley, Asheboro, N. C., assignor to General Electric Company, a corporation of New York Application May 19, 1955, Serial No. 509,440

10 Claims. (Cl. 219—20)

My invention relates to improvements in electric circuits and controls therefor, and more particularly, to improvements in circuits and control for heating devices, such as heating pads, etc.

In various heating devices, it is desirable to obtain selectively several temperature settings. By way of example, in heating pads, it is customary to provide a plurality of different settings by which the pad may be operated at any of several selected temperatures. In accordance with my invention, I employ two control thermostats arranged in series with each other and in series with the heating element, and I provide a separate thermostat heater for each of these thermostats. A simple control arrangement is secured which gives an improved performance and provides a relatively wide range of accurately controlled temperature settings of the heating pad.

It is an object of my invention to provide an electric circuit and control therefor for securing a plurality of different temperature settings of a heating device.

It is another object of my invention to provide an electric circuit and control therefor whereby a wide range of temperature settings of the heating device is secured.

It is a further object of my invention to provide such wide range of temperature settings with a minimum of wires between a control switch and the heating device.

Other objects and advantages of my invention will become apparent as the following description proceeds and the features of novelty which characterize my invention will be pointed out with particularity in the claims annexed hereto and forming part of this specification.

For a better understanding of my invention, reference may be had to the accompanying drawing in which Fig. 1 is a schematic wiring diagram of an embodiment of my invention applied to a heating pad.

Fig. 2 is a simplified diagram showing the active portions of the circuit at the low temperature setting.

Fig. 3 is a simplified diagram showing the active portions of the circuit at the medium temperature setting.

Fig. 4 is a simplified diagram showing the active portions of the circuit at the high temperature setting.

In carrying out the objects of my invention, two control thermostats are provided in series with the heating element. In the specific form of my invention, illustrated, the heating element is divided into two portions, one of which has a substantially smaller resistances than the other, and the control thermostats are inserted in series with the heating element. Also in accordance with the specific form of my invention illustrated, the control thermostats are calibrated to operate at the same temperature. A separate heater is provided for each thermostat. A selector switch is arranged in the circuit so that in one position, the two thermostat heaters in series are connected across one portion of the heating element; in a second position, one of the thermostat heaters is connected in parallel with a series circuit including the other thermostat heater and the aforementioned portion of the heating element; and in a third position, a thermostat heater is connected in parallel with the aforementioned portion of the heating element.

While it will be obvious as the description proceeds that my invention is applicable to a wide range of heating devices, for convenience, it will be described in connection with one specific application, namely, the controlling of the temperature of a heating pad.

Referring to the drawing, the heating pad is indicated diagrammatically by the rectangle 1, and the control or selector switch is indicated diagrammatically by the rectangle 2. The heating pad includes a heating element 3 which is formed of a first portion 4 and a second portion 5. In the diagrammatic illustration employed, the heating element has been shown for clarity of illustration of the remainder of the circuit as extending along only one edge of the pad, but it will be obvious that in actual practice, the heating element will be distributed in any suitable manner uniformly over the entire area of the pad so as to secure a uniform heating of entire surface thereof.

In series with the two portions 4 and 5 of the heating element 3 are arranged two control thermostats 6 and 7. A thermostat heater 8 is arranged adjacent the control thermostat 6 for supplying heat thereto, and a separate second thermostat heater 9 is arranged adjacent the control thermostat 7 for supplying heat to this second control thermostat.

Power is supplied to the heating pad from any suitable power source through a conventional plug 10 and power leads 11 and 12. In the circuit illustrated, the lead 11 extends through the selector switch 2 to one end of the heating element 3. Specifically in the form illustrated, this lead 11 is connected to one end of the portion 5 of the heating element, the opposite end of this portion 5 being connected to the control thermostat 7. In the specific form illustrated, the two thermostats 6 and 7 are placed in series between the two portions 4 and 5 of the heating element; however, if desired, the series thermostat may be placed in the line 11.

In order to selectively control the temperature of the heating pad, the selector switch 2 includes two terminals 13 and 14, and a manually controlled arm 15 for engaging these terminals. In the diagrammatical illustration, this arm 15 has been shown merely as an L-shaped member pivoted at 16, but it will be apparent that in a commercial form of this device, the arm 15 would include a suitable knob for manual actuation and may be constructed in any suitable form satisfactory to make the connections necessary for achieving the separate temperature settings in the manner described below.

The terminal 13 of the selector switch 2 is connected by a lead 17 to a junction 18 at one end of the portion 4 of the heating element, the opposite end of this portion of the heating element being connected to the control thermostat 6 at the junction 19. The lead 17 further extends to connect to one end of the thermostat heater 9. The terminal 14 is connected by a lead 20 to a common junction point 21 between the thermostat heaters 8 and 9. The opposite end of the thermostat heater 8 is connected to the previously mentioned junction point 19 common to the control thermostat 6 and one end of the portion 4 of the heating element.

In order to describe more fully the circuit arrangements employed to achieve the several temperature settings in accordance with my invention, Figs. 2, 3 and 4 have been drawn in simplified form to show the active portions of the control circuit in the low, medium and high temperature settings. In the low temperature setting, the selector switch arm 15 is moved so that it engages only the terminal 14, thereby providing a path from the lead 12 through the selector switch to the lead 20. With this circuit connection, the thermostat heater 8 is placed in parallel with a series circuit comprising the thermostat heater 9 and the portion 4 of the heating element. The circuit relationship is shown more clearly in the simplified diagram, illustrated in Fig. 2.

In the circuit illustrated, the portion 4 of the heating element 3 is substantially lower in resistance than the portion 5. Similarly, in the circuit illustrated, the thermostat heater 8 has a substantially smaller resistance than the thermostat heater 9. By way of a specific example, in one form of my invention, the portion 4 of the heating element has been chosen to have a resistance of 40 ohms and the portion 5 to have a resistance of 200 ohms. Similarly, in this specific form of my invention, the resistance of the thermostat heater 8 was chosen as 33 ohms, and that of the thermostat heater 9 as 300 ohms. With this general circuit arrangement, it will be apparent that in the low temperature setting shown in Fig. 2, the greater portion of the current will flow through the parallel path provided by the thermostat heater 8, and this heater will dissipate a substantially greater amount of heat to its control thermostat 6 than the heater 9 will dissipate to its control thermostat 7. Since the control thermostats are preferably calibrated to operate at substantially the same temperature, the effective control of the energization of the heating element in the low temperature setting is provided by the control thermostat 6. The heating element will therefore be de-energized when the control thermostat 6 has been brought to its cut-off temperature by the thermostat heater 8. With the above circuit arrangement and the general resistance values referred to above and with the two control thermostats both calibrated to open the circuit of the heating element at approximately 190° F., the heating pad may be maintained, for example, at a temperature of 125° F.

To obtain a somewhat higher temperature of the heating pad, for example, 145° F., the selector switch 2 is moved to the medium temperature position. To accomplish the necessary circuit change, the arm 15 of the selector switch is moved to contact both the terminals 13 and 14. In this position of the selector switch, the active portions of the circuit are shown in Fig. 3. Referring to Fig. 3, it can be seen that the thermostat heater 8 is now connected in parallel with the portion 4 of the heating element. The thermostat heater 9 is shorted by the engagement of the arm 15 with both contacts 13 and 14 so that it is effectively removed from the circuit.

With the circuit arrangement shown in Fig. 3, the control thermostat 6 is obviously the one effective for controlling the energization and de-energization of the heating element, since no heat is being supplied to the control thermostat 7 by its thermostat heater 9 for elevating the temperature of this latter thermostat. The thermostatic heater 8 receives a smaller current than in the circuit arrangement illustrated in simplified form in Fig. 2. Accordingly, less heat is dissipated from the thermostat heater 8 to its control thermostat 6 and a greater time is required to bring the control thermostat up to its cut-off temperature. Therefore, the heating element 3 is energized for a greater length of time, and the heating pad is raised to a higher temperature, for example, 145° F.

To obtain a still higher temperature of the heating pad, the selector switch arm 15 is shifted so that it contacts only the terminal 13. The active portions of the circuit in this temperature setting are shown in simplified form in Fig. 4. Referring to Fig. 4, it can be seen that the two thermostat heaters 8 and 9 are connected with series with each other and in parallel with the portion 4 of the heating element. With this circuit connection, the current to the thermostat heater 8 is substantially reduced over that received by the thermostat heater in the medium temperature circuit shown in Fig. 3. In fact, since, as referred to generally above and as indicated by way of example in the specific resistance values, the resistance of the thermostat heater 9 substantially exceeds that of the thermostat heater 8, in the circuit shown in Fig. 4, the thermostat heater 9 dissipates substantially greater heat to its control thermostat 7 than does the thermostat heater 8. Since the two thermostats are calibrated at the same temperature, the thermostat 7 becomes the effective controlling thermostat in this temperature setting.

It will be appreciated that a very greatly reduced current flows through the series circuit including the two thermostat heaters than through the single thermostat heater 8 alone in the circuit arrangement shown in Fig. 3. The net result is that the heat dissipated by the thermostat heater 9 in the circuit arrangement shown in Fig. 4 is substantially less than that dissipated by the thermostat heater 8 in the circuit arrangement shown in Fig. 3. Since a smaller amount of heat is received by the control thermostat providing the effective control in the form shown in Fig. 4, it will require a greater length of time for the thermostat to be brought to its cut-off temperature. Accordingly, the heating element will be energized for a greater length of time and the pad brought to a still higher temperature, for example, 165° F.

It will be seen that I have provided an effective control circuit for a heating pad, etc., in which, by the use of simple circuit connections, a wide spread of heating pad temperatures is secured. It will be seen that while two control thermostats have been provied, one or the other takes over the control of the heating pad in a particular temperature setting. For example, in the circuit arrangement shown in the simplified diagrams of Figs. 2, 3 and 4, the thermostat 6 provides the effective control of the energization of the heating element in the low and medium temperature settings, and the thermostat 7 provides the control in the high temperature setting.

While I have described my invention in connection with a heating pad as one specific embodiment, it will be apparent that the control circuit can be readily applied to other types of heating devices, and I intend, by the appended claims, to cover all modifications within the spirit and scope of my invention.

What I claim as new and desire to secure by Letters Patent of the United States is:

1. In an electric heating device and an electrical circuit therefor, a heating element including a first portion and a second portion, two thermostats connected in series with each other and in series with said heating element for controlling asid heating element, a thermostat heater for each of said thermostats, one of said heaters having a substantially smaller resistance than the other, and a selector switch for varying the temperature of said heating device, said switch being movable to a first position in which said thermostat heaters are connected in series with each other across said first portion of said heating element to obtain one temperature setting of said heating device and to a second position in which one only of said heaters is connected across said first portion of said heating element to obtain a second temperature setting of said heating device.

2. The combination of claim 1 wherein said selector switch is further movable to a third position in which one of said thermostat heaters is connected in parallel with a series circuit comprising the other of said thermostat heaters and said first portion of said heating element to obtain a third temperature setting of said heating device.

3. The combination of claim 1 wherein both of said thermostats are calibrated to operate at the same temperature.

4. The combination of claim 1 wherein said two thermostats are connected in series between said first portion of said heating element and said second portion of said heating element.

5. In an electric heating device and an electrical circuit therefor, a heating element including a first portion and a second portion, two thermostats connected in series with each other and in series with said heating element for controlling said heating element, a thermostat heater for each of said thermostats, one of said heaters having a substantially smaller resistance than the other, and a selector switch for varying the temperature of said heating device, said switch being movable to a first position in which said heaters are connected in series with each other across said first portion of said heating element to obtain one temperature setting of said heating device and to a second position in which only the thermostat heater having the smaller resistance is connected across said first portion of said heating element to obtain a second temperature setting of said heating device.

6. The combination of claim 5 wherein said selector switch is further movable to a third position in which the thermostat heater having the lower resistance is connected in parallel with a series circuit comprising the other of said thermostat heaters and said first portion of said heating element to obtain a third temperature setting of said heating device.

7. The combination of claim 1 wherein said first portion of said heating element has a substantially smaller resistance than said second portion of said heating element.

8. The combination of claim 7 wherein said selector switch is movable to a third position in which one of said thermostat heaters is connected in parallel with a series circuit comprising the other of said thermostat heaters and said first portion of said heating element to obtain a third temperature setting of said heating device.

9. In an electric heating device and an electrical circuit therefor, a heating element including a minor portion and a major portion, said major portion having a substantially greater electrical resistance, two thermostats connected in series with each other and in series with said heating element for controlling said heating element, a thermostat heater for each of said thermostats, one of said heaters having a substantially smaller resistance than the other, and a selector switch for varying the temperature of said heating device, said switch being movable to a first position in which said heaters are connected in a series circuit with each other, said series circuit being in electrical parallel with the minor portion of said heating element and in series with said major portion, said selector switch being movable to a second position in which only said thermostat heater of smaller resistance is connected in electrical parallel with the minor portion of said heating element to obtain a second temperature setting.

10. The combination of claim 9 wherein said selector switch is further movable to a third position in which said thermostat heater of larger resistance is in electrical parallel with the minor portion of said heating element to obtain a third temperature setting of said heating device.

References Cited in the file of this patent

UNITED STATES PATENTS

| | | |
|---|---|---|
| 1,758,177 | Skinner | May 13, 1930 |
| 2,024,153 | Eskin | Dec. 17, 1935 |
| 2,122,650 | Keene | July 5, 1938 |
| 2,237,852 | Taylor | Apr. 18, 1941 |
| 2,360,084 | Taylor | Oct. 10, 1944 |
| 2,382,312 | Heinrich | Aug. 14, 1945 |
| 2,421,953 | MacKendrick | June 10, 1947 |
| 2,441,005 | Bradford | May 4, 1948 |
| 2,579,926 | Johnson | Dec. 25, 1951 |
| 2,705,276 | Wise | Mar. 29, 1955 |
| 2,768,273 | Crowley et al. | Oct. 23, 1956 |
| 2,772,338 | Crowley | Nov. 27, 1956 |